US008966952B2

(12) United States Patent
Pepper

(10) Patent No.: US 8,966,952 B2
(45) Date of Patent: Mar. 3, 2015

(54) TEST EQUIPMENT FOR TESTING HAZARD DETECTORS

(75) Inventor: Stewart Pepper, Hertford (GB)

(73) Assignee: Sata Limited, Hertfordshire (GB)

( * ) Notice: Subject to any disclaimer, the term of this patent is extended or adjusted under 35 U.S.C. 154(b) by 738 days.

(21) Appl. No.: 12/094,917

(22) PCT Filed: Nov. 24, 2006

(86) PCT No.: PCT/GB2006/004398

§ 371 (c)(1), (2), (4) Date: Nov. 14, 2008

(87) PCT Pub. No.: WO2007/060447

PCT Pub. Date: May 31, 2007

(65) Prior Publication Data

US 2009/0308134 A1 Dec. 17, 2009

(30) Foreign Application Priority Data

Nov. 24, 2005 (GB) .................................. 0523958.7

(51) Int. Cl.

*G01N 21/00* (2006.01)
*G08B 29/14* (2006.01)
*G08B 29/12* (2006.01)

(52) U.S. Cl.

CPC .............. *G08B 29/145* (2013.01); *G08B 29/12* (2013.01)

USPC .......................................................... 73/1.06

(58) Field of Classification Search

CPC ............ G01N 33/0006; G01N 33/007; G01N 2033/0072

USPC .......................................................... 73/1.06

See application file for complete search history.

(56) References Cited

U.S. PATENT DOCUMENTS

| | | | | |
|---|---|---|---|---|
| 3,693,401 | A * | 9/1972 | Purt et al. | 73/1.05 |
| 5,523,744 | A * | 6/1996 | Wieser | 340/630 |
| 6,282,940 | B1 | 9/2001 | Hung et al. | 340/515 |
| 2002/0047782 | A1 | 4/2002 | Schneider et al. | |
| 2004/0035179 | A1 * | 2/2004 | Koch | 73/1.06 |

FOREIGN PATENT DOCUMENTS

| | | | | |
|---|---|---|---|---|
| GB | 2373048 | A | 3/2001 | |
| GB | 2373048 | | 9/2002 | G01N 33/00 |
| GB | 2409319 | A | 12/2003 | |
| WO | WO03067542 | A | 8/2003 | G08B 29/14 |
| WO | WO03067542 | A1 | 8/2003 | |
| WO | WO2004034051 | A | 4/2004 | G01N 33/00 |

* cited by examiner

*Primary Examiner* — Harshad R Patel
*Assistant Examiner* — Alex Devito
(74) *Attorney, Agent, or Firm* — Koppel, Patrick, Heybl & Philpott

(57) ABSTRACT

Apparatus for testing a hazard detector, the apparatus comprising electrically-powered generating means arranged to generate at least two stimuli for application to the detector; and control means arranged to control the generation of each stimulus by said stimulus generating means, wherein said generating means includes a carbon monoxide generator.

41 Claims, 4 Drawing Sheets

TEST EQUIPMENT FOR TESTING HAZARD DETECTORS

The present invention relates to hazard detector test equipment and in particular hazard detector test equipment which produces stimuli for such detectors.

BACKGROUND TO THE INVENTION

Hazard detection systems can utilise a variety of sensors to detect hazards, including smoke sensors, heat sensors, gas sensors, etc. Equipment to carry out testing of different types of hazard detector is already available worldwide, and a well-known brand is 'SOLO' test equipment. In the past, each hazard sensor has often been housed in its own separate hazard detector, and test equipment to execute the testing of such detectors has mainly used a single test stimulus to activate the sensor concerned, e.g. a heat source is used in an item of test equipment to test a heat detector, etc. The test stimulus (heat, in this example) is designed to replicate the hazard in a non-hazardous fashion, so that the correct operation of the detector and/or the system can be verified without the risk of duplicating the real hazard (e.g. a real fire).

In the case of heat detectors (or any fire detector incorporating heat sensors), a common test method involves blowing hot air from an electrical heating element. The draught of hot air is typically directed at the heat detector, or even just at the heat sensor itself, causing its temperature to rise and the operation of the sensor, the detector, and even the complete cause and effect program of the fire detection system to be checked.

In the case of smoke detectors (or fire detectors which incorporate smoke sensors), a common test medium is an aerosol 'smoke' which simulates real smoke. It can be deployed from an aerosol can into the detector, often using a special dispensing tool, so that the operation of the smoke detector and its role within the fire detection system is checked. Also, the test stimulus should be introduced into the hazard detector from outside it, i.e. from the surrounding air, so as to ensure that the entry path to the sensor is not blocked in any way, impeding the ability of the detector to react properly to the hazard.

Functional testing of fire detectors in such a manner as described above is well approved and respected as a good and necessary test of the functioning of a hazard detector. This is widely enough accepted that it is now enshrined in international test standards and codes for the maintenance of fire detectors in various regions of the world (e.g. NFPA 72 in the USA, BS5839 Pt 1 in the UK, etc.).

By contrast, other test methods which do not include the application of a stimulus to the sensors from outside the detector are not widely approved, and indeed are actively prohibited by some test standards. These methods include testing using a magnet which is held close to the detector body, closing a reed switch internally to complete an electrical circuit which indicates an alarm state, or testing a detector for function by means of its internal electronic behaviour only, often done remotely from the control and indicating equipment to which the detector is connected. These methods are not deemed to be sufficient to satisfactorily test the entire operation of the detection device. For example, it may be possible for a hazard detector to have a protective dust cover installed over it, thereby preventing the products of a real hazard from entering its sensors, and yet electrically it may appear to be fully functional and capable of indicating an alarm. Clearly, in this scenario, the 'electronic only' test is inadequate since a real hazard would not be detected in such a case, although the test itself may have been apparently passed.

In the case of carbon monoxide detectors (or any detector which incorporates carbon monoxide sensors) a common test method is to introduce small quantities of carbon monoxide to the detector under test. Alternative methods for testing CO sensors within detectors have been known to use other gases such as hydrogen, but the sensors are known to have variable cross-sensitivities to these, and this does not represent a true test that a CO sensor responds to the actual gas which it is intended to detect. Furthermore, the use of a highly flammable gas (such as hydrogen) is not advisable in close proximity to live electrical circuits.

Increasingly, hazard detectors have more than one sensor within them, thereby detecting the hazard using more than one means. The information gathered from multiple sensors can lead to increased efficiency and enhanced speed of reaction in hazard detection. This can protect life and property better and also reduce unwanted alarms.

In the case of fire detectors, for example, a combination of smoke, heat and gas sensors can be packaged together in a single detector. With such an arrangement, the decision concerning the presence of a hazard can be made more effectively, and preferably sooner, and can avoid unnecessary alarm signals for non-threatening hazard stimuli. For example, for fire detection, the presence of smoke alone may not be an indicator of a real fire (e.g. cigarette smoke may be present, although the threat of fire is not sufficiently high to raise an alarm), but the added presence of a sudden increase in temperature and/or the presence of a rising level of combustion gas (i.e. a gas produced as a result of combustion) indicates a much higher probability of a real fire. The gas and/or the heat may even be present before much smoke is prevalent, so by also sensing the gas and/or heat, an earlier alarm could be raised compared to a detector which was only able to sense smoke, for example.

A suitable analysis of the output of multiple sensors can also serve to assist in the reduction of false (or unwanted) alarms by determining which sensors are activated and making a more informed decision to raise the alarm. For example, false alarms are a major concern for the UK fire industry, and so the installation of more multisensor type fire detectors to reduce false alarms is becoming widespread. In addition, there are many ways to interpret the readings of more than one sensor within a detector. The output from multiple sensors can be combined in such a fashion so as to produce a more intelligent response. Software algorithms can be employed either within the detector itself or within the system's control and indicating equipment in order to determine when and if the alarm signal should be raised.

Individual sensors within a multisensor detector may also be disabled or partially disabled (by reducing their sensitivity) to eliminate the risk of false alarms, particularly at certain times of the day or night. For example, in a combined smoke/heat detector, the smoke sensor may be disabled (or set to lower sensitivity) during the hours the building is occupied to avoid false alarms from, say, cigarette smoke. Whenever the building is unoccupied, however, for example at weekends and at night, a greater degree of protection against fire can be enabled by fully activating both the heat and the smoke sensors at higher sensitivity. Utilising an intelligent algorithm can further enhance this. The end result is that a fire can be detected at the earliest possible moment without the risk of an increase in false alarms.

Given the many advanced operating features and the possible combinations within multisensor detectors, testing them is challenging. The use of a safe, clean and environmentally friendly technique is paramount, and so the challenge of testing is made more acute. The generation of real hazard stimuli is not conducive to safe and clean execution and potentially risks harming the future integrity of the hazard detector itself and may even present risks to users of the test medium. The use of simulated hazard stimuli is therefore considered to be the most appropriate means of testing.

With multiple sensors, a single surrogate stimulus (which is intended to simulate the presence of just one of the detectable signs of the hazard) may not be sufficient for the detector to determine that an alarm signal should be raised. Hence, traditional testing techniques used for either a smoke or heat detector may not be sufficient to fully test a multisensor detector. This includes the use of synthetic or simulated smoke aerosols deployed from aerosol cans for the testing of smoke detectors.

In order to test a multisensor hazard detector, it may be possible to operate it in a special test mode, whereby the detector is not operating all its sensors in the usual combined fashion, but in such a manner as to differentiate the responses of each sensor. It may even be the case that such a test mode permits the proper evaluation of the performance of any individual sensor within the detector independent of the other sensors. During testing in this mode, the activation of individual sensors could be signified by the detector's own indicator (e.g. LED) or it may be indicated at the control and indicating equipment to which the detector is connected. In such a test mode, it would be possible to use just one test stimulus at a time for testing. However, in the case that a test mode of this nature is not available or desirable, it may be necessary to use more than one stimulus at the same time. Then, the combined effect of more than one stimulus on the detector simultaneously would be required to activate the detector during a test. Testing such a detector with the normal detection algorithms running (either within the detector itself or within the control and indicating equipment, to which the detector is connected) implies that the detector will only indicate an alarm signal when the combination of stimuli meet the criteria for a real hazard. However, it may be possible to meet these criteria while only activating some of the total number of sensors, and so it can not be seen as a thorough test, as the alarm state may have been reached without the requirement for a particular sensor to respond. This leaves open the possibility that this sensor may indeed not be working. On the other hand, other algorithms may require a response from all sensors within a multisensor detector before an alarm signal is raised, but since it can not easily be determined in a maintenance setting precisely how the detection system operates, the preferred method of maintenance would be to use a test mode as described above.

It is important that each individual sensor within a multisensor detector should be tested for function in its own right, so that when the detector is configured for any mode of operation (utilising some or all of those sensors), it may be able to be relied upon to work correctly. It would be of little use, for example, in a combined smoke and heat detector, to only test the function of the smoke sensor. If that detector were then configured in a mode which relied heavily (or even solely) on the heat sensor, then its correct operation would not have been properly validated.

A far better test would be to introduce multiple test media to the detector to perform functional tests on all the sensors within that detector. That way, any single sensor (or combination of sensors) which is then utilised by the detector in a real life hazard protection situation can be relied upon to react to the hazard correctly.

SUMMARY OF THE INVENTION

The present invention provides apparatus for testing a hazard detector, the apparatus comprising:

electrically-powered generating means arranged to generate at least two stimuli for application to the detector; and control means arranged to control the generation of each stimulus by said stimulus generating means.

The apparatus combines the requirements of multiple stimulus testing for single sensor and multisensor detectors with advanced simulated stimuli generation as will be described in more detail below.

The apparatus may be configured to contain any two or any combination of several stimulus generators. For example, the apparatus may include, a heat source for testing the thermal element of a hazard detector, a smoke generator for testing smoke sensors and a CO generator for testing carbon monoxide sensors. It is therefore applicable for the testing of both single sensor hazard detectors (e.g. a smoke detector or a heat detector) and multisensor detectors (e.g. a combination of smoke, heat and carbon monoxide sensors).

When used for testing single sensor detectors, it has the advantage that it permits a single test tool to be used. For example, the user does not need to carry more than one test tool, swapping between a smoke detector testing tool and a heat detector testing tool when encountering both types in succession. Instead, he can use the one tool, and simply deploy the required stimulus to the detector in question. This will save much time in testing and maintaining even single sensor hazard detectors, where often many must be tested in succession. It is also much more convenient for the user to only have one piece of equipment to carry.

When the apparatus is used for testing multisensor hazard detectors which contain any combination of heat, smoke or CO sensors, it now becomes practically possible to test each individual sensor within the detector using just one tool, so that full operation of the detector is verified swiftly and efficiently. To test such detectors with multiple tools would be very cumbersome and time-consuming, and may even be impossible should the detector require more than one sensor to be activated simultaneously during a test. Moreover, in the case of the present invention, even deploying multiple stimuli simultaneously would be theoretically possible, thereby not only properly testing the individual sensors within a multisensor hazard detector but within the shortest possible time. (Note: this requires that the hazard detector can be configured to permit such a test).

Preferably, the apparatus includes an opening arranged to accommodate a hazard detector. The opening is preferably formed in the top of the tester so that when it is moved up against a detector, it fits around the detector so that tests can begin.

The apparatus is preferably provided with means for moving the generated stimulus from the apparatus to the detector under test. In particular, the apparatus may be include ducts which are arranged to channel the stimulus from the stimulus generating means to the detector under test. The apparatus may also utilise fans or blowers to assist the movement of the stimulus.

The apparatus preferably includes control means arranged to control the operation of the apparatus and the individual stimulus generating means. Preferably the control means is a PIC microcontroller which controls the generation of the stimuli.

The stimulus generating means can be controlled to produce stimulus in any manner appropriate to the detector under test. In particular, the stimulus generating means can be controlled to produce different stimuli in different quantities, in combination or individually. The stimuli can be controlled to be generated sequentially or simultaneously, depending on the requirements of the tester.

Preferably the present invention uses advanced methods of stimulus generation in order to test some of the latest hazard detectors. Advanced techniques are required due to the level of sophistication in some of these detectors.

Such detectors are often sufficiently advanced to be able to distinguish between various real stimuli and 'false' stimuli so as to minimise the occurrence of false alarms. For example, some fire detectors can distinguish between smoke and steam, in an attempt to reduce the number of false alarms from smoke detectors fitted in areas where steam might be prevalent (such as shower or bath rooms, kitchens, etc.).

The tool is intended to test hazard detectors which are still in situ, for example on the ceilings of public buildings. Such detectors are hard to reach. Preferably, the apparatus is designed to reach these detectors by being mounted on a pole. In this case, the pole may have a battery power source located within it. Thus, power may be made available to the test apparatus, even while operating at the top of the pole many meters from the ground. Alternatively, the tool may itself be located on the ceiling. For example, the tool may be positioned next to a detector and be provided with means to move the generated stimulus into the vicinity of the detector. Another possibility is that the testing tool may be located in the same unit as the detector itself. In either event, the tester tool may receive its power through a connection in the ceiling.

BRIEF DESCRIPTION OF THE DRAWINGS

So that the present invention can be more readily understood, embodiments thereof will now be described by way of example only and with reference to the accompanying drawings in which.

DETAILED DESCRIPTION OF THE PREFERRED EMBODIMENTS

Figure 1:
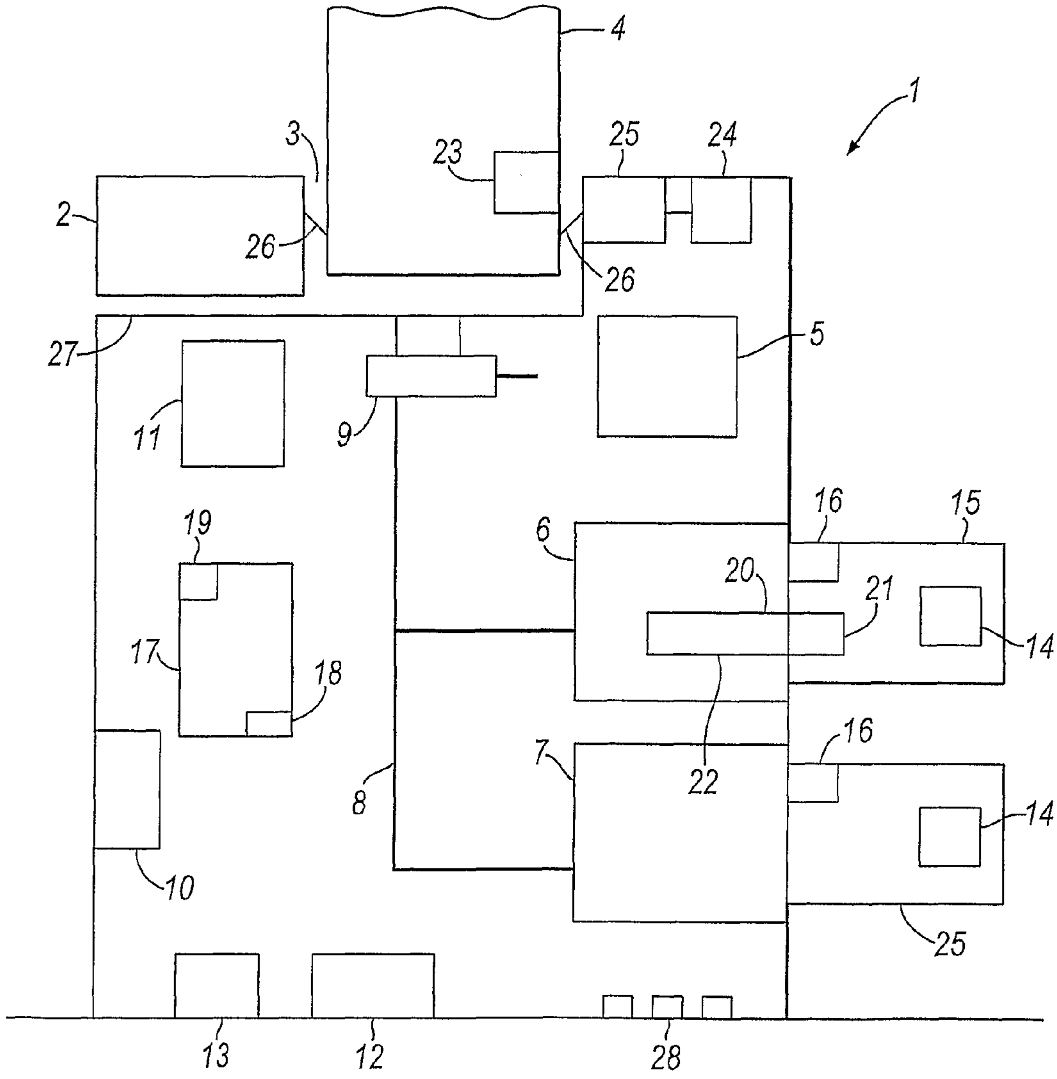
FIG. 1 shows a schematic diagram of the test apparatus according to an embodiment of the invention.

Referring now to FIG. 1 which shows a schematic diagram of the test tool according to a first embodiment of the present invention. It will be appreciated that this diagram is representative of the tool and it various components and is not limiting on the structure of the tool and arrangement of its components. The test tool 1 includes an outer housing 2 which includes an opening 3. The opening is generally cup-shaped and is arranged to receive a detector/sensor 4. The actual dimensions and configuration of the housing and opening will depend on the type of detector/sensor the tool is intended for use with. A number of stimulus generating units 5, 6 and 7 are positioned within the tool. In this case, the tool is provided with a heat generator 5, a smoke generator 6 and a carbon monoxide generator 7.

Ducts 8 are provided between the stimulus generating units 5, 6 and 7 and the opening 3. The tool utilises fans and/or blowers 9 to move generated stimuli (e.g. smoke) in the direction of the detector/sensor under test 4. In use, the tool is positioned over the detector such that the detector is inserted into the opening in the top of the test tool. The tool is normally carried by hand and power is provided by a battery 10. Alternatively, the battery may be replaced with an electrical connection 10 to an external power source. For example, the tool can be arranged to be mounted on the end of a pole to enable the tool to be positioned over detectors on high ceilings. The battery may be located in the pole and the electrical connection may be formed where the tool is mounted on the pole.

The tool is also provided with a diaphragm 26 which is in the form of a flexible membrane positioned around the edge of the opening 3. The membrane is arranged to accept the detector/sensor under test and reduce or eliminate the air gap between the opening and the detector/sensor. In this manner the amount of stimuli which can escape is reduced and tests can be carried out more efficiently. It also limits the effect of external draughts on the operation of the tool as the membrane shields (at least in part) the atmosphere in the cup from them.

It is important that the duct arrangement is designed to ensure an efficient and realistic flow of stimulus from the stimuli generating means 5, 6, 7 to the opening. For example, it is important for heat sensor testing that the flow of (heated) air is aimed directly at the thermal sensor in the detector, so as reduce the amount of power required to raise the temperature of the sensor, without necessarily heating other parts of the detector and/or the air around it. The duct arrangement is so designed as to ensure that, for the vast majority of detectors, the air stream carrying the stimuli (especially heat) can enter the detector housing and reach the sensors. Additionally, the stimulus generated by a real hazard would typically flow laterally across the detector. This characteristic is taken into account when configuring the duct arrangement.

In particular, in the preferred embodiment, the tool is designed to be placed over the detector/sensor under test from below. However, as noted above in a real hazard situation it is likely that the stimulus generated by the hazard in question will flow along the ceiling into the detector/sensor from the side. The ducts therefore preferably arranged to introduce the stimuli into the detector/sensor under test laterally. In particular, the ducts and fans are arranged to channel a stream of air to carry the stimuli which are generated in the tool to the detector in such a fashion that they flow transversely across the opening 3 into which the detector/sensor is placed. The walls surrounding the opening 3 may be made of transparent material so that the detector/sensor may be seen during the test. This can be particularly useful with detectors/sensors in which alarm status is indicated by an LED mounted on the detector/sensor.

Figure 2:
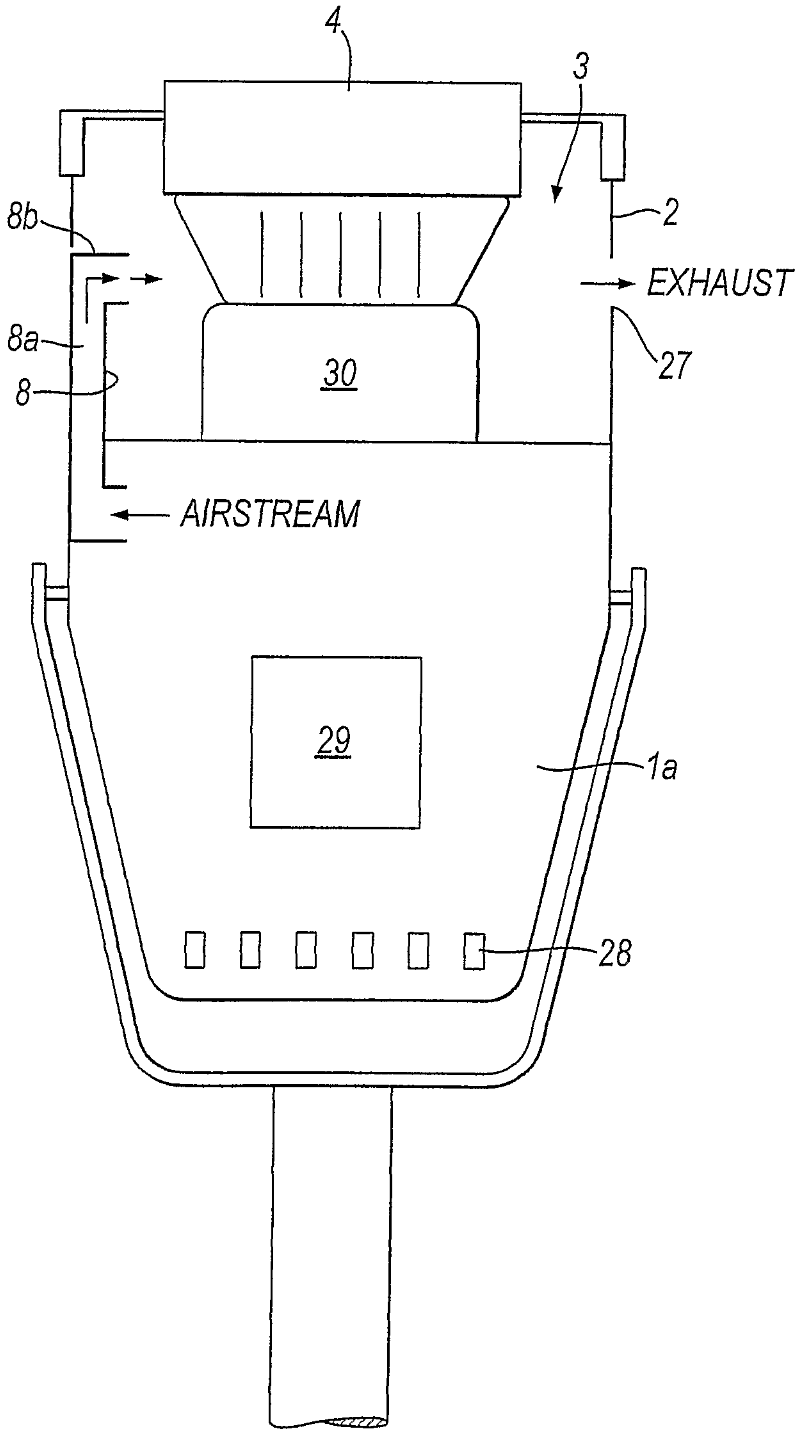
FIG. 2 is a schematic diagram of the test apparatus according to an embodiment of the invention showing a duct arrangement.

FIG. 2 is a schematic diagram of a multi-tester tool according to the present invention, in which particular emphasis is placed on the duct arrangement. Features common to FIG. 1 and FIG. 2 are identified with like reference numerals. The various stimulus generating means and other components shown in FIG. 1 are located in the lower portion of the housing 29. The tool as shown comprises the housing 2 arranged to surround the detector/sensor 4 under test. The stimulus and air flow are ducted up one side of the cup so as to flow laterally across the opening. To ensure that the diameter of the tool is kept to a minimum, thereby providing for good access to tight spaces with a tool, the stimulus and airflow are generated by means located in the lower portion of the housing 29. It may be necessary to provide a air inlet 28 to the housing in order that the fan can provide an efficient air stream. The opening has an exhaust port 27 which allows the air stream to exit the housing. Corresponding air inlets 28 and exhaust port 27 are shown in FIG. 1.

The test tool is provided with a duct 8 which has a portion 8*a* which is parallel to the wall of the opening and has a portion 8*b* of aperture arranged to direct the air flow or stimulus generally normal to the plane of the wall of the opening 3 and thus across the opening. The duct can be provided, if designed, with a nozzle or other restricting arrangement in order to direct the airflow in a precise direction.

The activation of some types of detector can be enhanced further by ensuring that the transverse flow of air is aimed and focussed onto the "sweet spot" of the detector's sensor. This technique can reduce the amount of stimulus required since it is aimed so directly at the sensing element. To do this, the location of the detector's "sweet spot" must be known.

In the case of heat detectors, the sensing element of the detector under test is often positioned nearer the lowest extreme of the detector casing from the ceiling. The actual distance of this sensing element from the ceiling may vary considerably (approx 20-80 mm), but the distance of the sensing element from the lowest point of the detector is relatively constant, (approx 0 to 20 mm). This geometry can be used to advantage when aiming and focussing the stream of air. Within the opening 3, a spacer 30 is used, which contacts the underside of the detector 4 when the opening 3 is positioned over the detector. This forms a reference from which the direction of the airstream from the duct 8 is positioned. With the lower part of the detector resting on this spacer 30, and the airstream is arranged to flow across the cup just above this support, the heat detector's sensing element is well positioned to be in the line of this movement of air. The stimulus required for the heat detector can then be applied to the air in the knowledge that the sensing element is going to be targeted. The size of the spacer 30 may be variable (either by adjustment or by replacement with alternatives of differing sizes) to permit different styles and shapes/sizes of detectors to be efficiently tested.

Since the flow of air can also be directed and narrowed by use of the duct, the amount of heated air which is required can be reduced, thereby further increasing the longevity of the battery in the tool. It is not required that the ambient air in the cup is heated to the required temperature for the detector under test, merely that the detector's sensing element is heated to the required temperature. Hence, a lot of energy is saved in not heating so much air and other surroundings (e.g. the casing of the detector, the casing of the tool) which are in contact with the air.

The same principles which have been applied to the testing of heat detectors in the above can also be applied to other types of detectors. The type of stimulus and the detail of ensuring that the stimulus is applied in the most efficient manner to the actual sensing element may vary. Other detectors which are used to detect fires include smoke and gas detectors. The stimuli required in these instances must be perceived by the detector to be like that emanating from fires that the detectors are intended to detect. The transverse flow of air across the cup will be similar, since the detectors are designed to accept air through lateral vents.

Referring again to FIG. 1, the tool is provided with control means 11 which may be a PIC microcontroller. The control means controls the operations of the tool, either using pre-stored algorithms or in response to manual instructions. The user is able to access the various functions of the tool through an LCD 12 and push-button control panel 13. Some features are may also be accessible by wireless/infrared remote control, so that the user can exercise control over the test procedure even when the tool is accessing a detector many meters off the ground on a long pole.

For example, each of the stimulus generating units 5, 6, 7 may be activated individually by selecting the appropriate unit through the LCD/push-button interface. The control means 11 has pre-stored control algorithms for each unit. For example, if the user selects a particular smoke test, the control means 11 is required to control how much synthetic smoke is produced, how long and fast the fans are blown both during and after smoke generation.

Furthermore, it would be preferable if the tool could simulate different types of hazard situations by varying the way in which the stimulus is delivered to the detector/sensor under test. The control means 11 is therefore arranged to provide the stimulus in either intense bursts or gradual trickles. This functionality may either be provided in response to a user instruction or as part of a pre-programmed algorithm.

Another requirement of the tool is that it should be capable of producing stimuli either simultaneously or in certain pre-programmed sequences. Thus, the control means 11 may be programmed to provide any combination of stimulus in combination or to provide the stimulus in sequence. For example, certain test situations may involve an initial rise in temperature followed by a gradual increase in smoke. The tool can be programmed to provide this simulated hazard situation.

The test criteria can either be entered manually by the user or pre-programmed into the control means 11 or entered manually on the remote control. Alternatively, the control means 11 may operate according to an algorithm provided by the detector under test.

Advanced methods of stimulus generation are employed so that the detectors are activated safely, cleanly, effectively and economically. For example, the characteristics of the synthetic smoke stimulus are such that it is not rejected as 'steam', even though it is not smoke. The synthetic smoke test medium is produced in the test tool, under electronic control by the PIC microcontroller. It is formed without combustion and is not harmful to humans, the environment or the detectors, and yet the detector is readily activated as the tool blows it into the detector. This way, these sophisticated smoke detectors may be tested safely without the use of real smoke, which contains contaminants which may leave a lasting residue in the detector.

Synthetic smoke may be generated by an electrically operated synthetic smoke generator. Such a generator comprises a source of vaporizable liquid, a tube one end of which is immersed in the source of liquid and the other end of which is provided with an electrical heater for vaporizing the liquid in the other end in order to generate synthetic smoke. The generator is designed to cause a sample of test synthetic smoke to be emitted in the vicinity of a detector under test.

Figure 3:
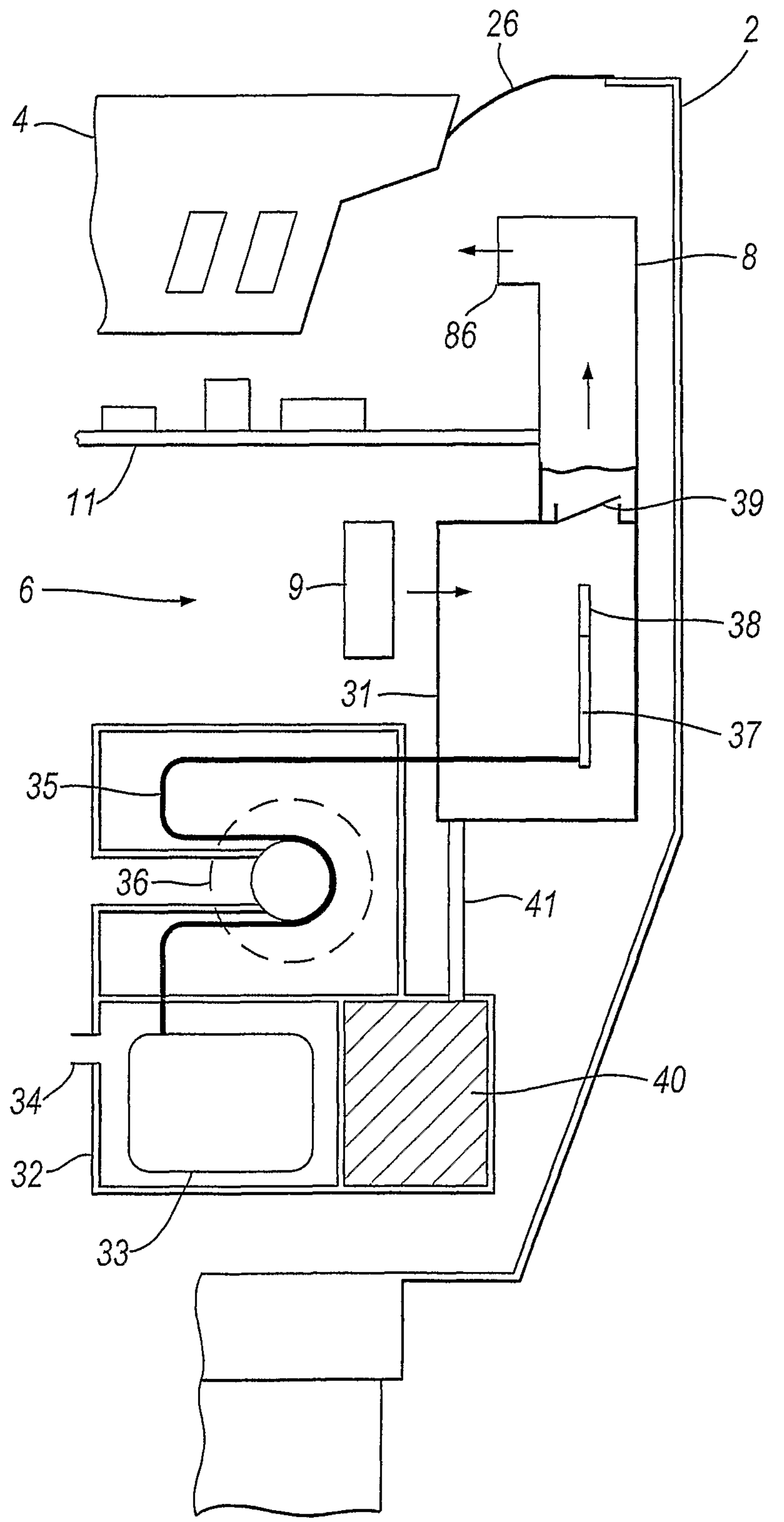
FIG. 3 is a schematic diagram of the test apparatus according to an embodiment of the invention showing a smoke generator arrangement.

FIG. 3, is a schematic diagram of a test tool according to the present invention, in which particular emphasis is placed on the synthetic smoke generator 6. Features common with FIGS. 1 and 2 are identified with like reference numerals. A detector under test which is indicated by the reference numeral 4. A smoke detector tester includes a cup shaped housing 2 which has a flexible membrane 26 with an opening of a size and shape capable of receiving the detector 4. The membrane has sufficient flexibility to allow for a range of different detector samples. Within the housing 2 there is provided a synthetic smoke generator generally indicated by the reference numeral 6. As shown, the generator is housed in a chamber 31 in a lower portion of the cup shaped housing 2 and communicates with the upper portion of the housing 2 by means of a duct 8 which has a horizontally directed outlet 8*b* for directing the synthetic smoke directly towards the detector 4 under test. This simulates the effect of smoke drifting across a ceiling or wall and entering a ceiling or wall-mounted detector during a fire. If desired, a spacer 30 (not shown) may be provided in order to accurately locate the outlet 14 with respect to the detector.

The synthetic smoke generator comprises a reservoir housing 32 (14 in FIG. 1) arranged to contain a vaporizable fluid in an airtight collapsible bag 33. The fluid used is preferably a mixture of some or all of propylene glycol, di-propylene glycol, polyethylene glycol and water. In addition, other components may be added to give suitable smoke characteristics. An air vent hole 34 in the reservoir housing 32 allows the bag to collapse as the fluid in the bag 33 is consumed. Fluid is supplied to the smoke generator 6 by means of a tube 35 which depends into the bag 33 and has at least a portion of its length subjected to the action of a pump which is preferably a peristaltic pump 36 (20 in FIG. 1; see below). The tube supplies the smoke generator 6 which is preferably in the form of a vitreous tube 37 provided with an electrically activated heater element.

The tube 37 is located in the chamber 31 which is subjected to the action of a fan or blower 9 to increase the pressure in the chamber 31. This will cause synthetic smoke in the chamber 31 to move into the duct 8 and out of the outlet 8*b* with the necessary velocity. In use, vaporizable fluid moves from the collapsible bag 33 through the tube 35 into the region of the heating element 38 under the action of the peristaltic pump 36. When the heating element is connected to a source of current, the heating element vaporizes the fluid in vitreous tube 37 in the region of the heating element which causes a synthetic smoke, actually a fog or mist, to be emitted from the top of the chamber 31. The fan or blower 9 is arranged to blow the synthetic smoke into the duct 8 and thence to the outlet 8*b* at sufficient speed to ensure that the detector 4 is activated promptly.

The flow of smoke from the chamber 31 into the duct 8 may be regulated by a flap valve 39 which can be opened and closed in a controlled fashion. In the present embodiment, control of the flap valve is achieved by utilising an actuating wire made from a shape memory alloy, trade name Flexinol, which contracts in length by an appreciable amount (typically 5%) when heated by passing an electric current through it. This contraction causes the flap valve to open. The valve is normally held closed by a spring (not shown). The tester is preferably battery powered and the batteries are most conveniently located at a position adjacent the tester body to reduce voltage drop between the batteries and the tester.

Control of the currents to the heating element 38, the fan 9, pump 36 and the valve actuating wire is accomplished using the above-mentioned control means which is arranged to control the heating element and pump to govern the attributes of the smoke generated. Fluid, when pumped into the tube 37 is boiled with the resulting vapour passing into the chamber 31 where it condenses to form a fog. The fan assists in condensation. Any large droplets of fluid or splashes which emerge from the top of the tube 37 or which arise from condensation on the side walls of the chamber 31 will run down the interior walls of the chamber 31 to the bottom where they are preferably channeled into a sponge 40 through tube 41. Sponge 40 can be housed in the reservoir housing 32 for convenience. Although not shown, the reservoir housing 32 can be replaced when the supply of fluid in the collapsible bag 33 is exhausted. Also, with the sponge 40 housed in the reservoir housing 32, the sponge is replaced at the same time, removing the need to replace it separately when or if it becomes saturated. Also, if the tube 35 is housed within the reservoir housing, it too is replaced at the same time the fluid supply is replaced, thus eliminating the possibility of malfunction of the pump due to wear of the tube.

The above arrangement has the advantage that the synthetic smoke can be produced continually and the amount of synthetic smoke actually dispensed is controlled by operation of the valve 39 and the fan 9. This is in contrast to previous arrangements where the amount of smoke produced was totally dependent on the amount of smoke instantaneously generated by the generator. Alternatively, the synthetic smoke can be produced as required and dispensed instantaneously if desired, controlled by operation of the element 38 and the fan 9, without the need for the valve 39.

After the hazard detector has successfully been activated using the synthetic smoke, it may be necessary to clear the smoke from inside the detector so that the detector or alarm signal can be reset. This may be done expediently with the present invention by using the fan 9 to blow clean air through duct 8 and out of outlet 8*b* into the detector. The smoke generation will not be operational at this time.

In the following, the CO generator section of the test tool will be described in more detail. Carbon monoxide sensors within hazard detectors may be activated by generating small amounts of carbon monoxide in the test tool, under electronic control by the PIC microcontroller 11. The CO gas is formed without the use of dangerous chemicals or flammable substances and in small enough quantities to be useful for testing but not harmful to the user. The gas is then blown gently into the detector and hence the sensor is tested.

In the following, an example of CO generation will be described with reference to FIGS. 4 and 5. Features which are common to FIGS. 1, 2 and 3 will be indicated with like reference numerals. The following example is based on the principle of heating Activated Charcoal Cloth (ACC) in a controlled manner, within an enclosure. When the temperature of the ACC reaches 80° C., CO generation begins in small quantities. Increasing the heat applied to the ACC, results in larger amounts of CO being produced. One of the attributes of using layers of activated carbon or ACC is that it is extremely safe as it will not burn or retain heat. Unlike the heating of Activated Charcoal pellets, the application of too much heat in the presence of oxygen will not cause self-perpetuating burning of the ACC leading to an uncontrollable run away scenario. Instead, the ACC will just form a harmless ash, making it safe to use. Further protection is afforded in that the controlling electronics regulates the amount of CO released, and this can be reduced or totally constrained. Thus, the principle employed in this example does not involve the combustion of the activated charcoal in the conventional sense. Conventional combustion is a rapid chemical process which involves the production of heat and usually light. Rapid combustion of carbon may result in the production of carbon monoxide (which is a well known process) but this is different to example employed here, in which there is no combustion of this type. When ACC is heated, there is no self-sustaining combustion and no production of heat or light. Instead, the ACC decomposes under the effect of heat to release CO without conventional combustion.

Figure 4:
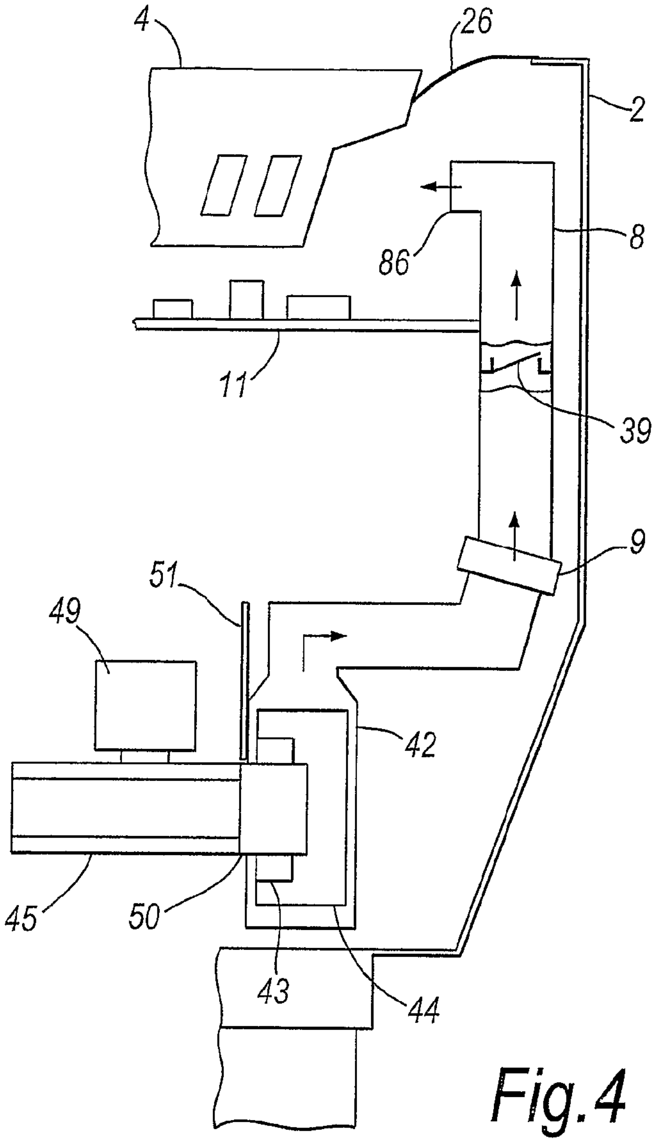
FIG. 4 is a schematic diagram of the test apparatus according to an embodiment of the invention showing a carbon monoxide generator arrangement.

FIG. 4 shows schematic diagram of a multi-tester tool in accordance with an embodiment of the present invention, with particular emphasis on the CO generator. FIG. 5 shows a schematic diagram of a cassette mechanism for use with the CO generator. In the following example, the generation of CO will be described independently to the generation of other stimuli, however it will be appreciated that the principles apply equally well to the generator of CO in the test tool as part of the present invention where there may be other stimulus generators present.

The CO generator 7 is located in a collection chamber 42, which resides in the lower part of the outer housing 2. It is connected to the upper portion by means of a delivery duct 8 containing a lift fan 9 and an optional regulator valve 39, which has a horizontal outlet 8*b* to direct the gas across the sensor/detector 4.

The CO generator 7 comprises an electrically operated heater assembly 43, mounted in a heat resistant retainer 44 and a cassette mechanism 45 (shown in more detail in FIG. 5) containing a length of ACC in the form of a ribbon 46. The heater assembly comprises of a wire heating element 47, enclosed within a glass tube 48, which can be either silica or quartz glass. The cassette 45 connects to a motor 49, which moves the ACC ribbon 46 in defined increments to present a fresh length of ACC to the heater assembly 43 for each test. The generator resides within the collection chamber 42, which connects to the delivery duct 8.

Figure 5:
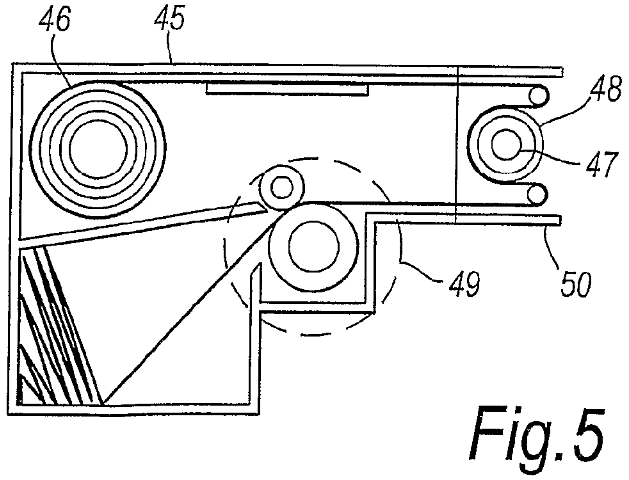
FIG. 5 is a schematic diagram of a cassette mechanism for use with the carbon monoxide generator arrangement.

FIG. 5 shows the cassette mechanism of the present invention. The cassette mechanism has a heat resistant tip 50, that is located in the housing 2 such that the ACC ribbon 46 is brought into contact with the heater assembly. When in place, the ribbon is wrapped around the heating assembly 43. When the ribbon is exhausted along its entire length, a new cassette can be inserted. As a further safety precaution, a safety shutter 51 actuated by the cartridge, covers the opening to the element so that a user can not physically touch it, even when the cassette mechanism is removed.

The ACC ribbon 46 is brought into contact with the heating assembly 43, through which an electric current is passed in a controlled manner using a defined algorithm. This heat is transferred to the ACC ribbon 46 so that the quantity of CO gas generated can be controlled. The generated CO is gathered within the collection chamber 42 and by the action of the lift fan 9, in conjunction with the optional regulator valve 39, is transferred through the delivery duct 8 at a controlled rate and hence to the output 8*b*. The flow of gas from the collection chamber 42 may be regulated by controlling the speed of the fan 9 and by the adjustment of the optional regulating valve 39. The inclusion of a CO sensor and a monitoring circuit within the tester would afford a more consistent control of the CO.

Control of the currents to the heating assembly, motor and the regulating valve are accomplished using the afore-mentioned control means 11 designed to control the attributes of the CO generator. Once the sensor/detector has gone into alarm, it may be necessary to clear the gas from the sensor/detector. This can be accomplished by turning off the CO generator and using the fan 9 to blow clean air over the sensor/detector. Alternatively, if separate fans are used for the smoke and heat airstreams, these may be used to clear any residual CO from the sensor detector.

In order to generate the synthetic smoke and carbon monoxide test stimuli, a process is undergone which results in the depletion of a fuel material 14 (which is different in each case). In the case of the surrogate smoke, the material consumed is a liquid which is based at least partly on glycols. The formulation of the liquid is important for obtaining the correct ‘smoke’ characteristics. In the case of the CO generator, the consumable is carbon based. In both cases, a removable/replaceable cartridge 15 is designed into the invention, so that a continuous supply of the test medium can be provided.

There is an electronic memory chip 16 on each cartridge which, among other functions, keeps a record of the usage of the fuel and provides the means to inform the user when it is time to replenish with a new cartridge, or when that time is approaching. This data can be re-written to the cartridge by the tool each time fuel is used, to keep the record of remaining fuel up-to-date. In the case that the cartridge is then removed and used in another tool, an accurate gauge of remaining fuel is still possible. The PIC microcontroller 11 controls communication with the memory chips 16 and is arranged to read information from and write information to the memory chips.

For smoke generation, fitting a new cartridge to the tool will possibly introduce air into the fuel supply line, and so the tool will need to ‘prime’ the new cartridge after fitting, in order to expel any air. The tool therefore includes a priming control unit 17. The trigger for the priming action can be simply by recognition of the data on the cartridge when it is first inserted. Should a partially used cartridge (maybe from another identical tool) be fitted though, it will not carry the data of an unused (and hence full) cartridge, so the trigger to perform the priming exercise will need to be additional data held on the cartridge memory. In the case that the cartridge is removed/replaced while the tool is switched off (or indeed the battery has been removed), the need to prime to remove potential air bubbles still exists, but since the same cartridge may be re-installed, checking for data on the cartridge will not be sufficient. In this case, a circuit which monitors the presence of the cartridge even while there is no power supply to the tool is utilised. As an example, a storage capacitor 18 may be used to provide a temporary power supply for a very low power latch circuit 19, which is reset when the cartridge is taken out. On re-insertion, the latch is not reset until the tool is switched on again, when the state of the latch is monitored prior to being reset. If it is found to be in a reset state, then the tool knows that the cartridge has been removed/replaced. In the case that the tool is not used for a period of time sufficient for the charge on the storage capacitor to decay away, the latch is automatically reset, which will result in the tool performing a priming action as above. This is a ‘failsafe’ situation, as the priming may well be beneficial after a long period of no use (especially at elevated temperatures), due to the possibility that the fuel may evaporate slightly from the open end of the supply tube and therefore cause an air bubble anyway.

An alternative to a very low power latch circuit is a very low power real-time clock (RTC) circuit with event and power failure detection circuitry, powered as before from a storage capacitor. The ‘event’ of cartridge removal/replacement is written to a small amount of SRAM memory in this circuit. The record of this event can then be read by the tool’s PIC microcontroller. Should the power source fail (e.g. the storage capacitor discharges) then the power failure detection circuit allows the PIC microcontroller to read this also by the state of a separate memory location which is read on power-up. Alternatively, this circuit may be powered from a long-life backup battery such as a lithium cell so that on event occurrence, an RTC reading can always be taken. Priming after a long period of no use can then be initiated subject to a chosen elapsed period on the RTC. In both cases, a priming action can be initiated when the event of the removal/replacement of the cartridge has taken place, even without the usual power source being connected.

In addition to priming the smoke generator, it is also beneficial if the tool can be flushed with air in order to expel any residual stimuli once a test has finished or before a test has started. Thus, the control means is arranged to operate the fans independently in order to flow fresh air through the system.

The control means can be arranged to do this automatically after a test or in response to a user input. This operation may serve not only to clear the ducts of the tool, but also to clear the detector/sensor under test. For example, once synthetic smoke has entered the detector/sensor, it may linger there causing the fire detection system to enter an alarm state continuously. Once the tool has stopped producing synthetic smoke, the fans are activated (or left on) in order to clear the synthetic smoke from the detector/sensor.

Also held in the memory is critical data concerning the operation of the tool with respect to the cartridge and its fuel. For example, software parameters relating to the control circuitry which manages the production of the test stimulus are held in the memory of the cartridge. Storing such data on the cartridge itself permits the data to be upgraded at a later date as new cartridges are manufactured, and for this data to instruct the complete test tool to deploy the test medium in a different fashion, for example, thereby modifying performance of the tool. This is particularly helpful in conducting product improvements to legacy products without software/firmware upgrades to the main tool. Instead, the cartridge which supplies the test medium carries the new data to the tool, even if that particular unit has been in use in the field for some time. The advantage of therefore controlling and improving product performance, or even customizing performance for a particular application or customer requirement, is that the tool can effectively be 're-programmed' without the need to return it for firmware upgrades.

The smoke 'fuel' is delivered to the smoke generator using a peristaltic pump 20, 36. Since pumps of this nature can wear, especially the tubing, the pump is constructed in two parts with the tubing 21, 35 residing in the replaceable cartridge portion. The remainder of the pump 22 is housed within the main tool itself. This ensures that any wear of the tubing will not cause the pump to deteriorate in performance as the tool is used. Normal wear within the lifespan of a fuel cartridge is nominal, and at the end of its life a new cartridge containing a new tube is inserted.

An additional feature in the present invention permits the user to read and/or write data to the hazard detector under test. While the test tool is conducting its tests of a detector, it is close enough for short range passive RFID. An RFID tag 23 affixed to or near the detector under test may be read only or may provide read and write functionality. The tag is then read and/or written to using an RFID reader 24 installed in the test tool. The antenna 25 for the reader is housed at a convenient position such as in the rim of the upper opening of the test tool. Data which is read from/written to the tag can be transmitted via a Bluetooth link (or other wireless link) with a compatible device held or worn by the user e.g. a Bluetooth-enabled PDA. The data can be linked into other software which may be used to enhance the administration of detector testing and maintenance operations.

It is possible that the user of the test tool may not require the use of RFID for his purposes, and so it is intended that the RFID/Bluetooth circuitry is housed in a module which may be fitted at a later date, if required. The antenna for the RFID reader can also be easily fitted when the RFID module is added. It simply attaches into pre-defined mechanical slots in the test tool, which enable it to be neatly housed and make efficient contact with the RFID module. This is done by manufacturing the antenna from a flexible PCB, the end of which forms a wiping contact connector with contacts on the RFID module.

Benefits of using the RFID module relate to the logging of test activities using the tool and the time efficiency of accessing the detector only once, using one tool to accomplish several tasks at the same time i.e. carrying out tests on smoke, heat and/or CO sensors within a detector very quickly, logging the result, time, user details, location, etc. for a subsequent report on the test/maintenance activity. Given that a detector may be situated on the ceiling many meters above head height, the requirement to only access it once is very beneficial and timesaving.

Another benefit is that the data stored in the RFID tag, which is attached to the detector, could include information on the detector which the tool itself could use. For example, if the detector requires a particular stimulus (or range of stimuli), deployed in a certain manner, say, the tag could hold this information. Then, when the test tool is brought into position to begin testing, the data from the tag is read, the tool is configured according to that data and the test conducted also in accordance with the data. This has the advantage that the user would not need to be knowledgeable concerning the type of detector, its configuration or its particular method of test. This is of particular advantage in the case of multisensor detectors, where the precise type or even mode of operation may not be clear to the user of the test tool, and yet the information could be readily transmitted from the RFID to the tool. It is equally applicable, however, to any detector which is being tested using this tool. It does require, of course, that the RFID tag has been correctly pre-programmed with the relevant information.

The test tool as described above may be fitted with smoke, CO and heat generators and an RFID module. In the case that all these are required to operate together, there are factors affecting the power supply which need to be carefully monitored. Given that the generators utilise power in different ways, including PWM power delivery to heating elements, the peaks of the PWM signals need to be separated if possible so as to reduce the size of the peak current demands on the battery power source. This relieves both the demands on the peak current ratings of the internal switching and wiring designs, but also of the battery pack. The peak currents are managed by the PIC microcontroller, which ensures that the largest peaks do not coincide whenever possible.

Power consumption is generally reduced by the careful combination of air flows to permit a single fan or blower to be used to provide delivery of the smoke, heat and CO to the detector under test. Reducing the number of fans and blowers reduces the power drain on the battery pack.

The tester tool may also be produced in modular form so that different stimulus generating means can be added or removed as required. This would improve the versatility of the device, allowing users to customise it to their needs. The different modules could be monitored and controlled by the control means. For example, in the event that the tool is instructed to perform a test for which no module is present, it could report this back to the user.

The present invention has been described in the context of testing multisensor and multidetector devices. Such devices typically incorporate at least two sensors/detectors of different types, e.g. heat and smoke sensors. It will be appreciated that the present invention may also be used with multicriteria devices which are arranged to detect two or more aspects of a sensed phenomenon, e.g. fixed temperature response and rate-of-rise response using a single sensor detector. As described above, the tool can be arranged to generate stimuli according to predetermined control parameters in order to test the response of the sensor/detector to different aspects of any given phenomenon.

The invention claimed is:

1. An apparatus for testing a hazard detector, the apparatus comprising:

a first electrically-powered stimulus generating means arranged to generate a first stimulus for application to the detector and for testing the functionality of a first sensor in the detector;

a second electrically-powered stimulus generating means arranged to generate a second stimulus for application to the detector and for testing the functionality of a second sensor in the detector, wherein the first and second electrically-powered stimulus generating means are positioned outside the detector and share a common housing and wherein the first sensor and second sensor are different;

wherein at least one of the first and second electrically-powered stimulus generating means comprises at least one fan arranged to move the stimulus from the at least one electrically-powered stimulus generating means to the detector, wherein said at least one fan is housed within said common housing;

a controller including one or more pre-stored algorithms that define multiple parameters of generation performed by the first and/or second electrically-powered stimulus generating means, wherein when a particular test is selected, the controller arranged to selectively control the individual, sequential and/or simultaneous generation of each stimulus by each of said stimulus generating means and vary the way in which stimulus is delivered to the detector under test by controlling how much stimulus is produced and how long the fans are blown during or after stimulus generation; at least one removable cartridge having material stored therein that undergoes a process for the generation of at least one of said first and second stimuli, wherein the at least one of said first and second stimuli is produced in the apparatus under electronic control of the controller; and an opening arranged to receive the hazard detector, wherein the opening is arranged in the apparatus such that when the apparatus is placed in proximity to a detector, it fits around the detector.

2. The apparatus of claim 1, further comprising a third electrically-powered stimulus generating means arranged to generate at a third stimulus for application to the detector.

3. The apparatus of claim 1 wherein at least one electrically-powered stimulus generating means is arranged to introduce stimulus to a detector from the side of the detector.

4. The apparatus of claim 3 wherein at least one electrically-powered stimulus generating means comprises a duct arrangement.

5. The apparatus of claim 1 wherein one of said generating means includes a carbon monoxide generator.

6. The apparatus of claim 5 wherein said carbon monoxide is generated from a carbon based material.

7. The apparatus of claim 5 wherein said carbon based material is stored in said cartridge.

8. The apparatus of claim 1 wherein one of said generating means includes a synthetic smoke generator.

9. The apparatus of claim 8 further comprising a peristaltic pump arranged to pump said synthetic smoke material from said cartridge to said smoke generator.

10. The apparatus of claim 9 wherein said peristaltic pump comprises a portion of tubing and a rotatably mounted pump member and the portion of tubing is positioned on said cartridge and the pump member is positioned on the apparatus.

11. The apparatus of claim 1 wherein said removable cartridge is provided with memory means to which said controller can read data from and/or write data to.

12. The apparatus of claim 11 wherein said memory means is further arranged to store control parameters for controlling the operation of the apparatus.

13. The apparatus of claim 1 further comprising data transfer means arranged to read data from and/or write data to a detector under test.

14. The apparatus of claim 13 wherein said data transfer means is arranged to receive test information concerning the test requirements of the detector, which said controller uses to control the generation of stimulus.

15. The apparatus of claim 14 wherein said data transfer means comprises an antenna arranged to communicate with a short range RFID device located on or near said detectors.

16. The apparatus of claim 1 wherein said controller is further arranged to prevent current peaks from coinciding.

17. The apparatus of claim 1 wherein one of said generating means includes a heat generator.

18. The apparatus of claim 17 wherein said heat generator comprises an electrical heating element and a fan.

19. The apparatus of claim 1 further comprising connection means arranged to connect said apparatus to a pole.

20. The apparatus of claim 19 wherein said pole includes a battery which provides electrical power to the apparatus through said connection means.

21. The apparatus of claim 1 wherein said controller is a PIC microcontroller.

22. The apparatus of claim 1 wherein said controller further comprises a user interface.

23. The apparatus of claim 22 wherein said user interface includes an LCD display and a push-button control panel.

24. The apparatus of claims 22 or 23 wherein said user interface further comprises a wireless device.

25. The apparatus of claim 24, wherein said wireless device is a radio, optical or infrared based device.

26. The apparatus of claim 24 wherein said wireless device is a remote control means.

27. The apparatus of claim 1 wherein said apparatus comprises at least one fan arranged to distribute said stimulus to said opening.

28. The apparatus of claim 1 wherein said apparatus further comprises a diaphragm arranged along the periphery of said opening.

29. The apparatus of claim 1 wherein said controller is configured to control different amounts of at least one of said first stimulus and second stimulus for application to the detector.

30. The apparatus of claim 1, wherein said parameters defined by said one or more pre-stored algorithms are configured to define different amounts of at least one of said first stimulus and second stimulus for application to the detector.

31. An apparatus for testing a hazard detector, the apparatus comprising:

electrically-powered generating means arranged to generate at least two stimuli for application to the detector; and control means arranged to control the generation of each stimulus by said stimulus generating means, characterised in that said apparatus further comprising at least one removable cartridge having material stored therein for the generation of a said stimulus, wherein said removable cartridge is provided with memory means to which said control means can read data from and/or write data to, wherein said control means is arranged to write data indicating the amount of material remaining in the cartridge.

32. The apparatus of claim 31 wherein said control means is arranged to provide an indication of when to replace said cartridge on the basis of said data indicating the amount of material remaining in the cartridge.

33. An apparatus for testing a hazard detector, the apparatus comprising:

electrically-powered generating means arranged to generate at least two stimuli for application to the detector;

control means arranged to control the generation of each stimulus by said stimulus generating means, characterised in that said apparatus further comprising at least one removable cartridge having material stored therein for the generation of a said stimulus; and priming means arranged to prime said apparatus when the cartridge is replaced.

34. The apparatus of claim 33 further comprising a trigger means arranged to provide said priming means with an indication of when said cartridge is replaced.

35. The apparatus of claim 34 wherein said trigger means is provided by a memory means.

36. The apparatus of claim 34 wherein said trigger means comprises a latch circuit which is reset when a cartridge is replaced.

37. The apparatus of claim 36 further comprising monitoring means arranged to monitor the status of said latch circuit when said apparatus is switched on.

38. The apparatus of claim 34 wherein said trigger means comprises a real-time clock (RTC) circuit.

39. The apparatus of claim 36 or 21 wherein said latch or RTC circuit comprises a temporary power supply.

40. The apparatus of claim 39 wherein said temporary power supply is a capacitor.

41. The apparatus of claim 38 wherein said latch or RTC circuit comprises a temporary power supply.

* * * * *